US006729630B2

(12) United States Patent  
Szmidt et al.

(10) Patent No.: US 6,729,630 B2
(45) Date of Patent: May 4, 2004

(54) CHILD CAR SEAT/STROLLER

(76) Inventors: Leszek G. Szmidt, 3240 Vichy Ave., Napa, CA (US) 94558; Joseph J. Hudak, 3444 W. Legendary Run, Cincinnati, OH (US) 45245; Keith J. Gale, 3288 Vichy Ave., Napa, CA (US) 94558; Barbara J. Madson, 9108 W. Bush Lake Rd., Bloomington, MN (US) 55438

( * ) Notice: Subject to any disclaimer, the term of this patent is extended or adjusted under 35 U.S.C. 154(b) by 35 days.

(21) Appl. No.: 10/141,927

(22) Filed: May 10, 2002

(65) Prior Publication Data

US 2003/0209885 A1 Nov. 13, 2003

(51) Int. Cl.$^7$ ................................................ B62B 1/00
(52) U.S. Cl. .................................. 280/47.25; 297/250.1
(58) Field of Search ............................. 280/47.25, 657, 280/658, 648, 30, 643; 297/5, 6, 250.1; D12/129

(56) References Cited

U.S. PATENT DOCUMENTS

| 2,990,190 | A | | 6/1961 | Eriksen | |
|---|---|---|---|---|---|
| 3,549,164 | A | * | 12/1970 | Raynor | 280/30 |
| 4,165,097 | A | | 8/1979 | Boudreau et al. | |
| 4,878,680 | A | | 11/1989 | Molnar | |
| 4,896,894 | A | * | 1/1990 | Singletary | 280/30 |
| 4,989,888 | A | * | 2/1991 | Qureshi et al. | 280/30 |
| 5,022,669 | A | * | 6/1991 | Johnson | 280/30 |
| 5,104,134 | A | | 4/1992 | Cone | |
| 5,133,567 | A | | 7/1992 | Owens | |
| 5,230,523 | A | * | 7/1993 | Wilhelm | 280/30 |
| D345,720 | S | * | 4/1994 | Pohl | D12/129 |
| 5,595,393 | A | | 1/1997 | Batten | |
| 5,779,304 | A | * | 7/1998 | Cunningham | 297/216.11 |
| 6,250,654 | B1 | | 6/2001 | Willis | |
| 6,296,259 | B1 | | 10/2001 | Anderson | |
| 6,367,821 | B2 | * | 4/2002 | Thiele | 280/30 |
| 6,491,348 | B1 | * | 12/2002 | Kain | 297/484 |
| 6,616,226 | B2 | * | 9/2003 | Yanagihara | 297/250.1 |
| 2003/0173804 | A1 | * | 9/2003 | Fisher et al. | 297/250.1 |

FOREIGN PATENT DOCUMENTS

JP             2002-36923      *  2/2002

* cited by examiner

Primary Examiner—Bryan Fischmann
(74) Attorney, Agent, or Firm—Richard C. Litman

(57) ABSTRACT

A combination child car seat and stroller is disclosed. The car seat has a seat portion and a fastening mechanism for fastening the car seat to an airplane seat or automobile seat. A harness secures the child in the seat. A telescoping pull handle is attached to the seat back. A roller assembly is attached to the seat portion proximate to the seat back. The roller assembly includes two rollers and at least one axle. The car seat is convertible for use in an automobile, on the ground, or in an airplane without removing the child from the seat. A folding stabilizer may be used to keep the rollers off the ground when desired. A canopy may be provided. In another embodiment, a wheeled support frame is provided of the appropriate width and which has clamps for the attachment of a standard car seat.

11 Claims, 9 Drawing Sheets

CHILD CAR SEAT/STROLLER

BACKGROUND OF THE INVENTION

1. Field of the Invention

The present invention relates to child car seats generally, and specifically to a combination child car seat and stroller having a telescoping handle.

2. Description of Related Art

Air travel with an infant or a small child is often a frustrating experience. Airports usually have parking areas, ticket areas, and boarding areas all widely separated. Many airports have various terminals, sometimes a half-mile or more apart. For a passenger, negotiating an airport therefore frequently requires walking long distances. Riding on a shuttle bus or a tram is often part of the trip as well. A child too small to walk on his own must either be carried or use a stroller or carriage of some kind.

Typical car seats have a number of disadvantages for air travel. Catching a flight may mean leaving home earlier than a child's usual waking hour. Frequently, a child who is wakened and dressed early on the day of the flight falls asleep in his car seat on the way to the airport. On arrival at the airport, he generally wakes when he is removed from his car seat. The same problem occurs in reverse when arriving at a destination or on returning home. A child's normal bedtime may arrive before the flight does, or before the luggage does. A child tired out by traveling may well fall asleep on an airplane at any time of day.

Typical strollers also have a number of disadvantages for air travel. Most strollers are too wide to fit down an airplane aisle. Even folded, most strollers are too large to fit under an airplane seat or into an overhead bin. Strollers must therefore be checked at the gate, if not sooner. The child then must be carried onto the plane, through the terminal when changing planes, and to the baggage claim. Many travelers prefer to carry only carry-on luggage, to save time both when boarding and on arrival. Checking a stroller makes checking baggage mandatory, adding time to the trip.

Carrying a child for a long distance tends to be awkward and exhausting, particularly when carrying luggage as well. The problem gets more difficult as the child gets older and heavier, but is not yet able to walk well. Toddlers walk much more slowly than adults, and often get tired or distracted after a short distance. This can be a serious problem when trying to reach a distant gate in time to catch a connecting flight.

Airlines generally recommend that babies and toddlers fly in a car seat. In the event of a crash, a child held on the lap of an adult is very likely to be injured or killed. Even simple turbulence can be dangerous to a lap child on an airplane. It is impossible for a parent to hold the child tightly enough to restrain him in emergency situations.

Many ordinary car seats can be used to secure children both in cars and in airplane seats. However, carrying a car seat from the car to the plane is awkward. It is nearly impossible for just one adult to transport a child, a stroller, and a car seat at the same time, even without additional luggage. Due to the known difficulty of this juggling act, regulators have been reluctant to require the use of child safety seats in airplanes.

Strollers which are convertible into car seats are known. The most common type has a car seat with a stroller frame. The car seat is removed from the frame and installed in the car for use as a car seat. This type of car seat has several disadvantages for air travel. Even with the car seat removed, the stroller frame is too large to fit under an airplane seat and must still be checked. Converting for use in the car, on the ground, and in the airplane tends to be complex and require several steps. Convertible strollers are also generally expensive, due to the complex mechanism.

It would be desirable to provide a child car seat with attached wheels so arranged as to remain with the child car seat when placed in a vehicle while restricting the overall width to fit in the isle of a commercial passenger aircraft. The seat may have wheels integral with the child car seat or a supporting frame with wheels which may be secured to a standard child car seat.

U.S. Pat. No. 4,878,680, issued Nov. 7, 1989, to Molnar, describes a convertible stroller car seat having a telescoping handle. The four wheels of the stroller are mounted on axles attached to a frame which supports the car seat portion of the stroller car seat combination.

U.S. Pat. No. US 6,296,259 B1 issued Oct. 2, 2001 to Anderson, describes child safety seat stroller having a rectangular frame base with four wheels.

U.S. Pat. No. US 6,250,564 B1, issued Jun. 26, 2001, to Willis, describes a car seat/stroller assembly with a rocker mechanism. Four wheels are provided at each corner of the rectangular base, which is adapted for mountably supporting the car seat.

U.S. Pat. No. 5,104,134, issued Apr. 14, 1992, to Cone, describes a convertible car seat/stroller with a telescoping handle. The shell of the seat covers the wheels during use as a car seat.

U.S. Pat. No. 5,133,567, issued Jul. 28, 1992, to Owens describes a combination infant carrier, car seat, and stroller. The seat portion is detachable and can be attached either to a stroller wheel assembly or to a car.

U.S. Pat. No. 5,595,393, issued Jan. 21, 1997, to Batten, describes a car seat/stroller. A production car seat has a set of holes drilled to receive a telescoping handle. The seat include a forward primary set of wheels which extend just below the bottom of the seat. The forward set of wheels is mounted on a flat bar bracket. The seat also has a retractable set of secondary wheels mounted by inserting an axle through a pivoting support leg.

U.S. Pat. No. 2,990,190, issued Jun. 27, 1961, to Eriksen, describes a combination infant stroller and support chair which may be used in a car. A chair support is used in conjunction with a stroller carriage having two wheels and a single telescoping handle. A kick stand is pivotally attached to the handle.

U.S. Pat. No. 4,165,097 to Boudreau et al. describes a removable stroller canopy of flexible sheet material.

None of the above inventions and patents, taken either singly or in combination, is seen to describe the instant invention as claimed.

SUMMARY OF THE INVENTION

The present invention is a combination child car seat and stroller. The car seat has a seat portion and a fastening means for fastening the car seat to an airplane seat or automobile seat. A harness secures the child in the seat. A telescoping pull handle is attached to the seat back. A roller assembly is attached to the seat portion proximate to the seat back. The roller assembly includes two rollers and at least one axle. The car seat is convertible for use in an automobile, on the ground, or in an airplane without removing the child from the seat. A folding stabilizer may be used to keep the rollers off the ground when desired. A canopy may be attached to the top end of the seat portion.

In another embodiment, a wheeled support frame is provided of the appropriate width and which has clamps for the attachment of a standard car seat. The support frame and wheels remain attached to the child car seat when placed in an automobile or aircraft seat. The width of the support frame is greatest at the wheels as located at the base of the support frame and are so spaced as to allow the frame and attached child car seat to travel along an isle of a commercial passenger aircraft.

Accordingly, it is a principal object of the invention to provide a child car seat having a seat portion, a fastening means, a harness, a pull handle, and a roller assembly.

It is another object of the invention to provide a car seat which can be converted to use in an automobile, on the ground, or in an airplane in a minimum number of steps, with little or no rearrangement of parts.

It is a further object of the invention to provide a car seat which is lightweight and inexpensive.

Still another object of the invention is to provide a car seat which is easy to maneuver in airplanes.

Another object of the invention is to provide a car seat having a folding stabilizer which lifts the wheels off the ground.

Still another object of the invention is to provide a wheeled support frame having attachment clamps for attachment to a standard child car seat which, when mounted on the standard child car seat is consistent with the above-mentioned objects.

It is an object of the invention to provide improved elements and arrangements thereof in an apparatus for the purposes described which is dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
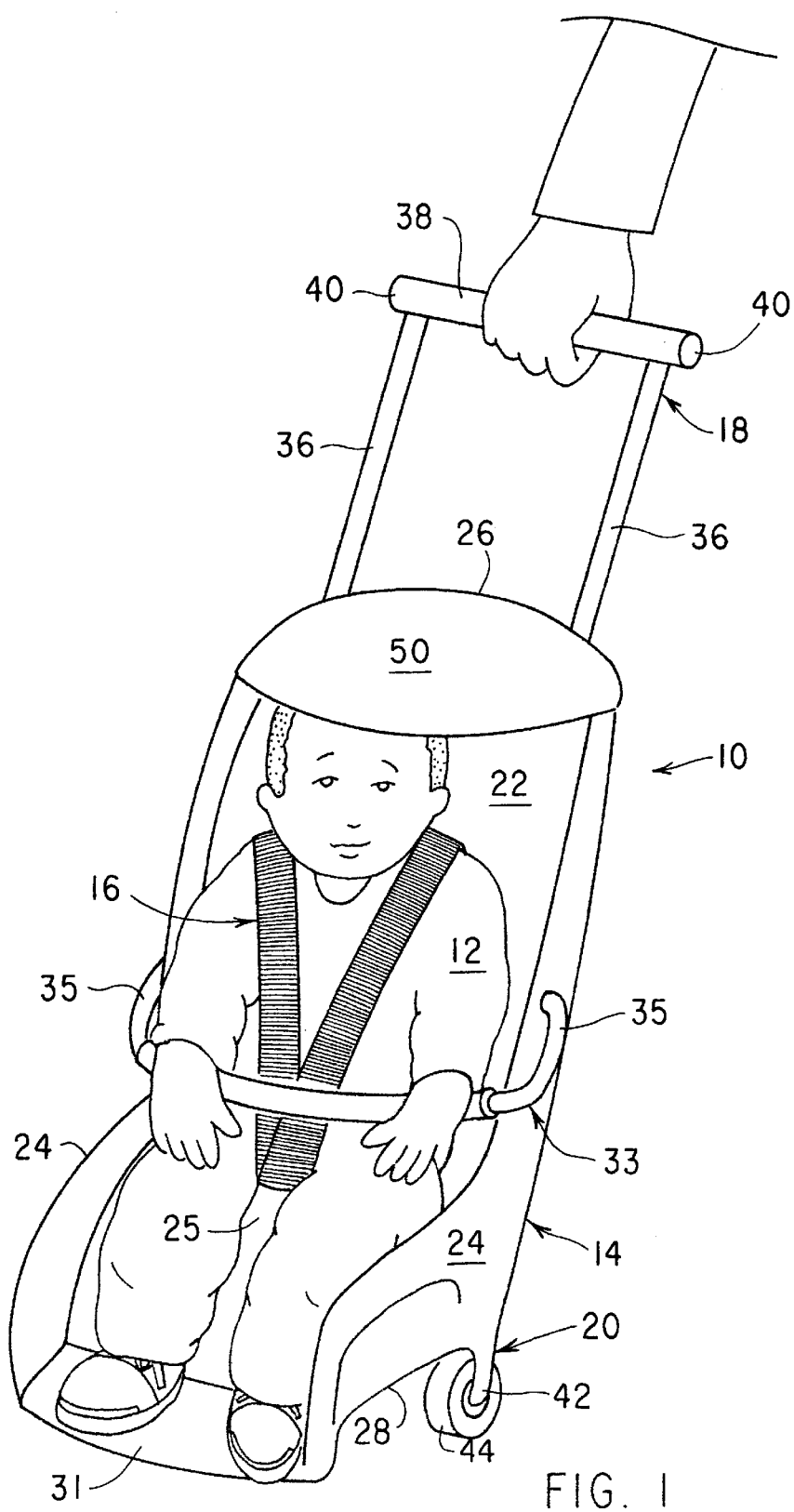
FIG. 1 is an environmental, perspective view of a child car seat in use as a stroller.

The present invention is a child car seat 10 for transporting a child 12. The car seat 10 includes a seat portion 14, a fastening means, a harness 16, a pull handle 18, and a roller assembly 20.

The seat portion 14 is a molded plastic shell. The seat portion is adapted to seat the child 12 and is preferably padded for the child's comfort. The seat portion preferably can accommodate a child weighing up to 40–50 pounds. The seat portion 14 meets the applicable state and federal regulations for child safety seats in automobiles and airplanes. The seat portion 14 has a seat back 22, two side edges 24, a top end 26, a bottom end 28, and a seating shelf 25. The seat back 22 and bottom end 28 preferably include compartmented ribs so that the seat portion is lightweight and rigid. The handle 18 also contributes to the rigidity of the seat back 22.

Suitable dimensions for the seat back are about 52 centimeters long and about 35 cm wide. The bottom end may have a length of about 40 cm front to back. The distance from the bottom end to the seating shelf 25 on which the child's bottom rests may be about 20 cm.

The seat portion 14 has an overall seat width less than the typical width of an airplane aisle. This allows the car seat to roll easily through an airplane directly to an assigned airplane seat. The car seat also fits easily through tight spaces in airline terminals, such as security checkpoints and restroom stalls.

Figure 2:
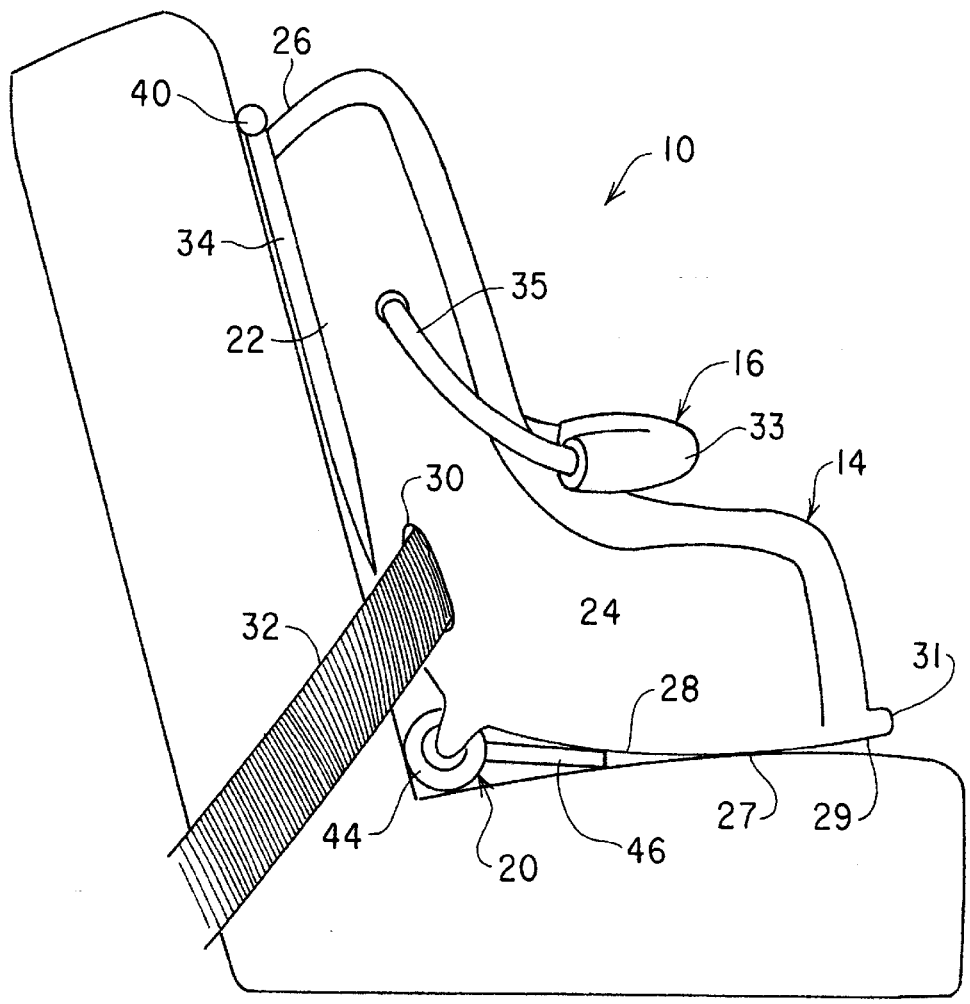
FIG. 2 is a side view of a car seat in an automobile.
Figure 6:
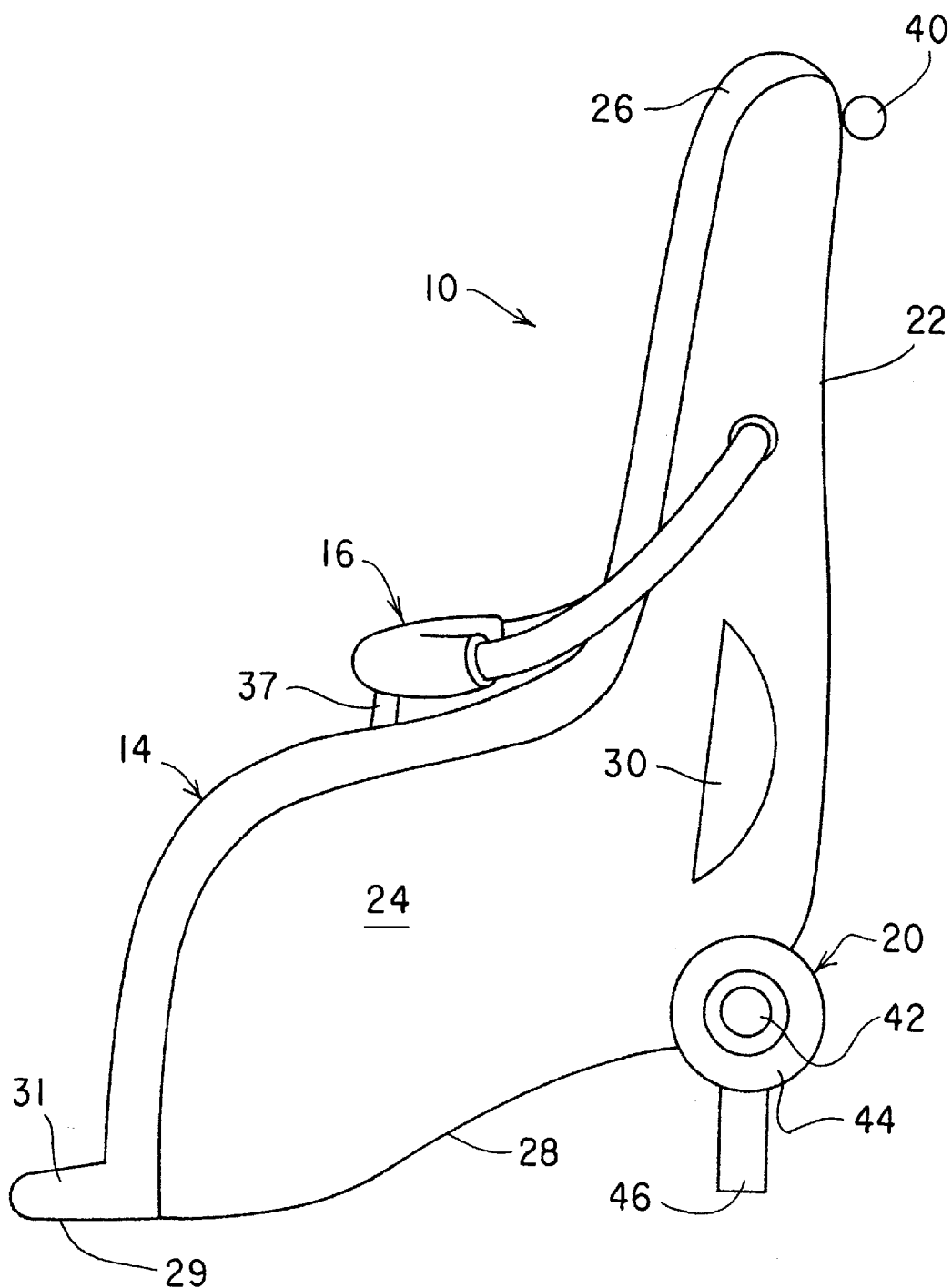
FIG. 6 is a side view of a car seat with a stabilizer in stabilizing position.
Figure 7:
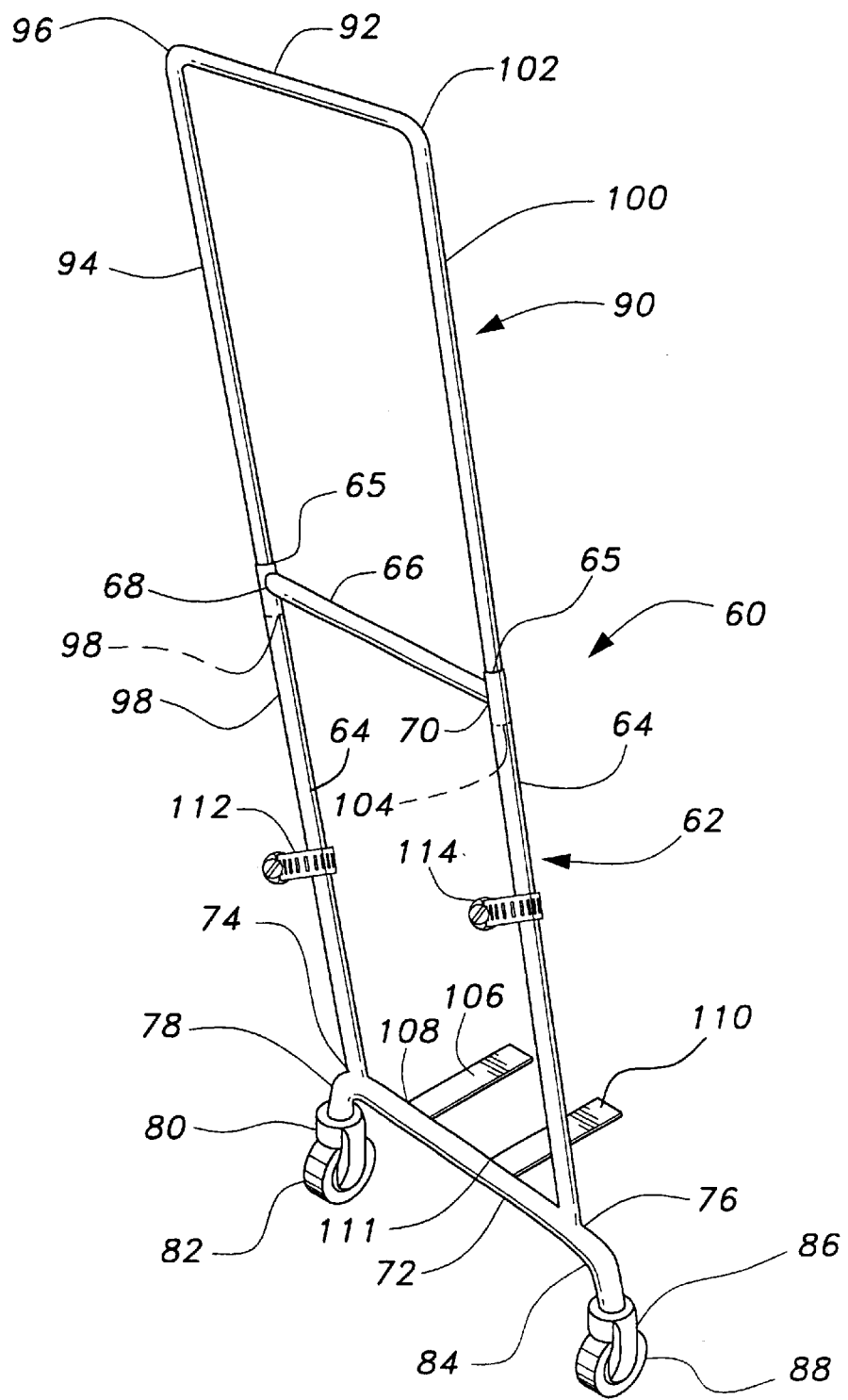
FIG. 7 is a rear perspective view of the another embodiment of the invention which is a detachable child car seat wheeled frame.
Figure 8:
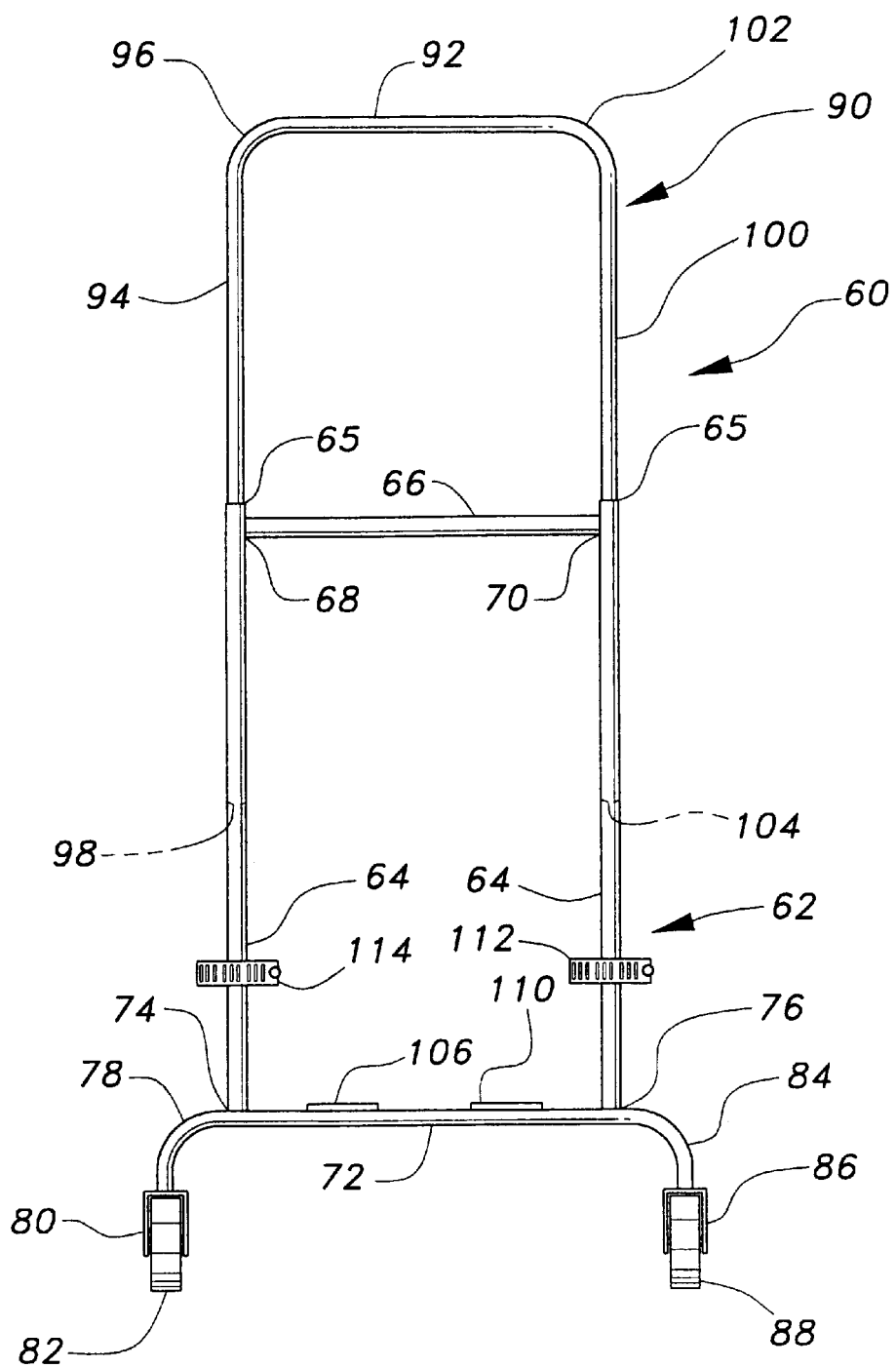
FIG. 8 is a front elevation view of the wheeled frame of FIG. 7 with the handle portion retracted.
Figure 9:
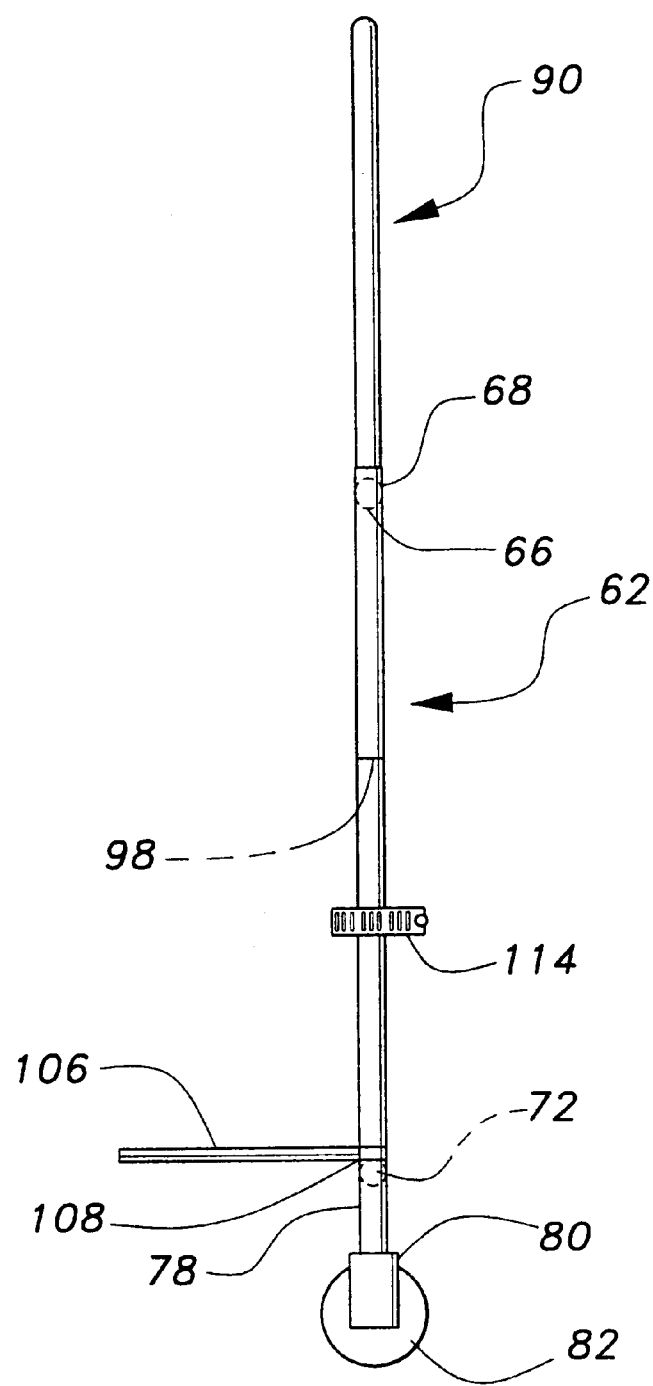
FIG. 9 is a side elevation view of the wheeled frame of FIG. 8.

The car seat 10 includes a fastening means for fastening the car seat to an automobile seat or airplane seat. The fastening means may be a fastening aperture 30 extending through the seat back 22, as shown in FIGS. 2 and 6. The seat belt 32 passes through the fastening aperture 30 to secure the seat, as shown in FIG. 2. The fastening aperture 30 is preferably located about ⅓ of the length of the seat back from the bottom end 28. This location allows for easy access for rapid fastening and unfastening, and also holds the car seat securely. The fastening aperture 30 is large enough for typical seat belt buckles on both automobile and airplane seat belts to pass through.

The seat portion 14 may include a footrest 31. If used, the footrest 31 is preferably integrally attached to the bottom end 28 of the seat portion 14. The footrest is located at the front end of the seat portion 14, opposite the roller assembly 20. The footrest 31 extends between the two side edges 24. The footrest 31 keeps the child's feet from contacting the surface and makes larger children more comfortable. The footrest 31 also reduces the amount of clearance required for the child's feet. If the distance between the bottom end and the seating shelf is 15 cm or more, a footrest may be unnecessary.

The bottom 29 of the footrest 31 may have a rubber surface to serve as a brake or as a resting pad. Alternatively the lowest portion 27 of the bottom end 28 may have a rubber surface and act as the resting pad.

The harness 16 is attached to the seat portion 14 and retains the child 12 in the seat portion. The harness 16, seat portion 14, and the fastening means work together to protect the child in the event of a sudden acceleration, such as that caused by an accident or severe turbulence. The harness may be a conventional 3-point or 5-point harness. The straps of the harness may extend through the seat back so that they are accessible for adjustment. See FIG. 3.

Preferably the harness 16 includes a harness bar 33, as shown in FIGS. 1, 2, 3, and 6. The harness bar 33 is padded and has two ends 35. Each end 35 of the harness bar 33 is attached to one of the side edges 24 of the seat portion 14. Preferably the harness bar has an attached harness bar strap 37 (shown in FIG. 6) extending between the child's legs.

Figure 3:
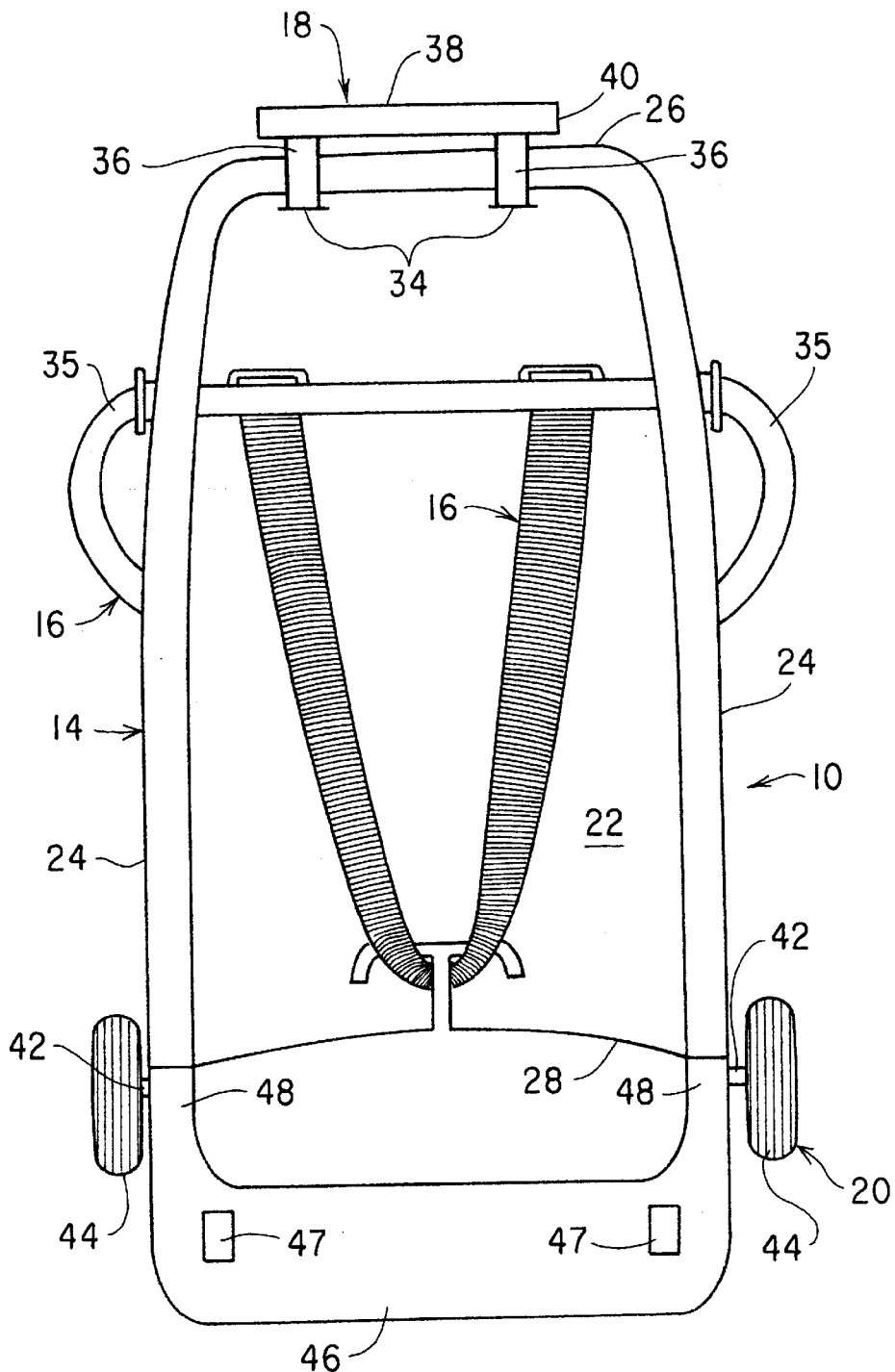
FIG. 3 is a back view of a car seat.

The pull handle 18 is rigid and has two slide tubes 34 and an extension portion. Each of the slide tubes 34 extends generally parallel to the side edges 24 of the seat portion 14 and is attached to the seat back 22. See FIG. 2. Preferably, each slide tube 34 is proximate to one of the side edges 24 of the seat portion 14. The slide tubes may be located within the seat back 22, as shown in FIGS. 3 and 6. The extension portion is generally U-shaped, as shown in FIGS. 1 and 3. The extension portion has two telescoping tubes 36 and a cross bar 38. Each of the telescoping tubes 36 mates with one of the slide tubes 34, as shown in FIG. 3. Preferably the telescoping tubes and cross bar are made of tubular steel. Each telescoping tube has a diameter of about ½ inch.

The cross bar 38 has two ends 40. The cross bar 38 may include a gripping member for comfortable pulling, such as a foam tube surrounding the cross bar. Each of the ends 40 of the cross bar 38 is attached to one of the telescoping tubes 36. The extension portion therefore has a retracted position and at least one extended position. The retracted position is shown in FIGS. 2, 3, and 6. The extended position is shown in FIG. 1. A locking mechanism, such as a pin lock, ideally secures the handle 18 in the desired position. In the extended position the cross bar extends about 18–19 inches beyond the top end of the car seat.

The roller assembly 20 is attached to the seat portion 14 proximate to the bottom end 28 and to the seat back 22. The roller assembly includes two rollers and at least one axle 42. Each roller is located inboard and proximate to one of the side edges 24. Each roller has a wheel portion 44. Each wheel portion 44 is rotatable about the axle 42. Preferably each wheel portion 44 has a diameter of between 1 ½ and 5 inches. The car seat 10 is adapted to roll along a surface on the rollers when pulled by the handle 18 in the extended position. The surface may be a parking lot, sidewalk, floor of a terminal or airplane, etc.

The weight of the child 12 is distributed between the rollers and the pull handle 18 when rolling, as shown in FIG. 1. This allows the car seat 10 to operate as a stroller with only two rollers. This represents a considerable savings in weight and complexity. Using only two wheels also makes the car seat 10 easier to handle when maneuvering in an airplane aisle, when lifting, or when fastening to a seat. Extra wheels have a tendency to catch on objects, particularly in tight spaces.

Figure 4:
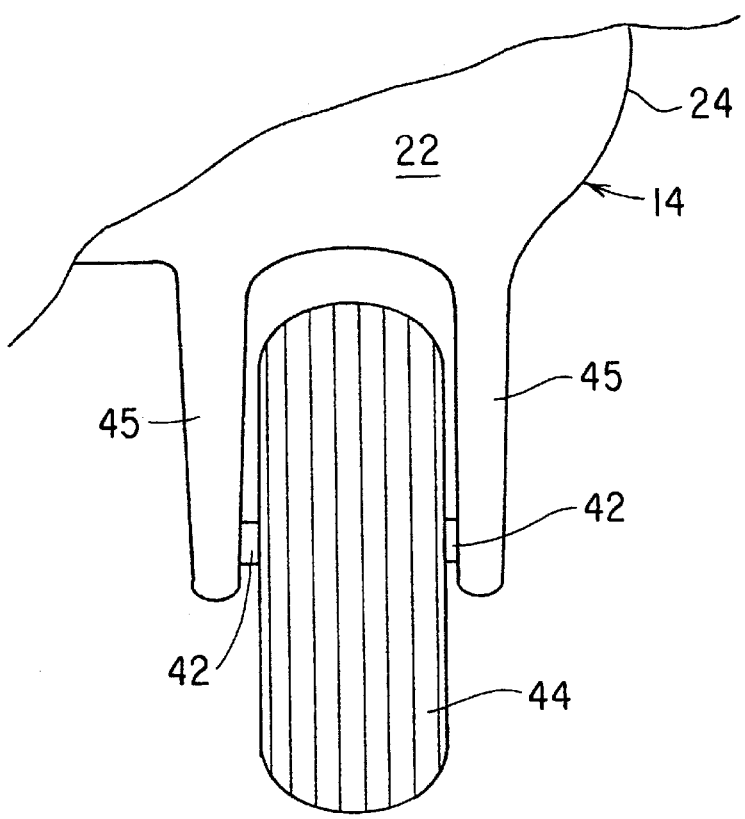
FIG. 4 is a detail view of a roller.

Preferably each roller includes at least one axle support 45. Optimally each roller includes two axle supports, as shown in FIG. 4. The axle 42 is preferably fixedly attached to the axle supports 45. Each axle support 45 is fixedly attached to the seat portion 14. See FIG. 4. This arrangement is stable and durable, and provides for the minimum number of steps when converting from safety seat use to stroller use.

The car seat 10 preferably has a stabilizer 46, as shown in FIGS. 2, 3, and 6. The stabilizer 46 is preferably pivotally attached to the roller assembly 20. The stabilizer 46 has a stabilizing position, shown in FIGS. 3 and 6, and a folded position, shown in FIG. 2. The stabilizer 46 in the stabilizing position is adapted to prevent the rollers from contacting the surface. A locking mechanism such as a pin lock or a ridge and groove arrangement(not shown) locks the stabilizer 46 in the desired position. The stabilizer 46 acts as a brake to prevent any tendency for the car seat 10 to roll away or turn. This is helpful for a parent who may be distracted with stowing luggage or the like.

The stabilizer 46 also places the child 12 in a more upright position. This allows the child to see more of his surroundings. The upright position is also useful for feeding the child.

Figure 5:
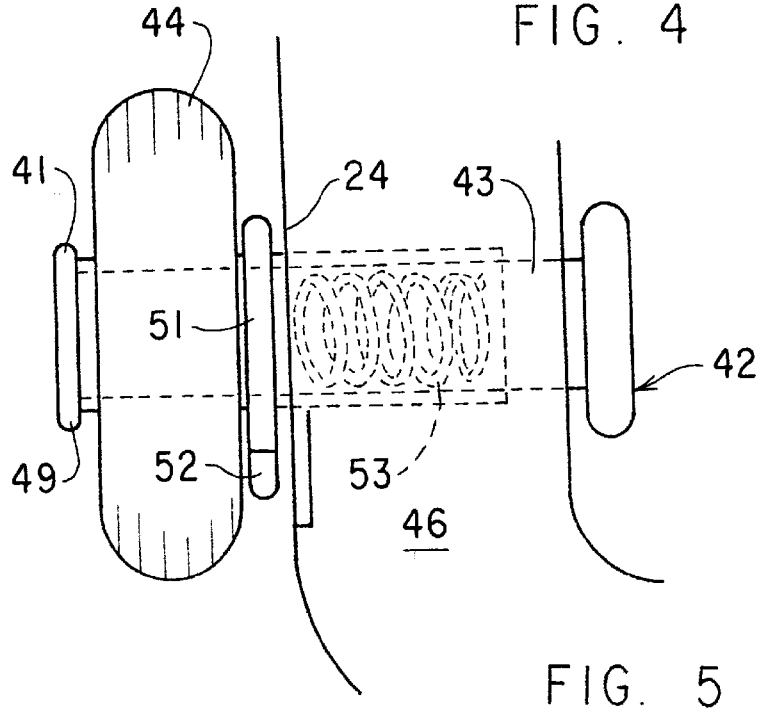
FIG. 5 is a detail view of an alternative embodiment of a roller.

The stabilizer 46 preferably is attached to the axle 42, as shown in FIGS. 3, 5, and 6. This simplifies the mechanism and makes the car seat lighter in weight. Preferably the stabilizer 46 is a U-shaped paddle and has two stabilizer ends 48, as shown in FIG. 3. The stabilizer is preferably about 24 cm across the bottom of the U, and about 10 cm from the bottom of the U to the stabilizer ends.

FIG. 5 shows an alternative roller. The wheel portion 44 extends to the side of the side edge 24. The axle 42 consists of an outer section 41 and an inner section 43. The outer end of the outer section 41 has a button 49. The wheel portion 44 is attached to the outer section 41 between the button 49 and a spacer 51 adjacent to the side edge 24. The inner portion 43 telescopes into the outer section 41. A spring 53 biases the outer and inner portions apart. The stabilizer 46 is pivotally attached to the outer section 41. Pressing on the button 49 compresses the spring 53. A tab 52 on the spacer unlocks the stabilizer 46, allowing the stabilizer to pivot. When the spring 53 is released, the stabilizer 46 is locked in place. Suitable locking mechanisms are commercially available.

The stabilizer 46 may include a pair of stabilizer apertures 47. The stabilizer apertures reduce the weight and may be used as the locking mechanism. For example, the stabilizer apertures may snap onto corresponding projections on the bottom end in the folded position. Each of the stabilizer ends 48 is attached to the axle 42. Where each roller has a separate axle 42, one of the stabilizer ends 48 may be attached to each axle. See FIG. 3. Ideally the stabilizer 46 in the folded position is adjacent to the bottom end, as shown in FIG. 2.

The stabilizer is used only when extra braking power, extra height, or a more upright position is wanted. The stabilizer may simply be left folded when the car seat is attached to a seat or being used as a stroller. The stabilizer therefore does not add any steps to the normal sequence of converting from safety seat use to stroller use and vice versa.

If a more upright position is desired in an automobile or airplane, the stabilizer may be left extended when the car seat is attached to a seat. In this case, only a single step of folding the stabilizer is required to convert from safety seat use to stroller use. This allows the child a better view.

The seat portion 14 may include a canopy 50. If present, the canopy 50 is preferably attached to the top end 26 of the seat back 22. Ideally the canopy 50 is detachable and foldable. The canopy prevents light from shining in the child's eyes.

The car seat 10 greatly simplifies traveling with an infant or toddler, while enhancing the child's safety. The car seat is easy to use. On leaving home, the child is placed in the car seat in the automobile and is protected during the trip to the airport. On arrival, the seat belt is unfastened and the car seat 10 is lifted out. Only a single step of pulling out the handle is then necessary to convert to stroller use. The child does not have to be transferred from one seat to another. If the child has fallen asleep on the way to the airport, he may simply remain sleeping in the car seat.

The car seat is easy to maneuver in the terminal and on the aircraft. Only one hand is necessary to pull the car seat along. An adult traveling with the child has a hand free to handle tickets, doors, diaper bag, or luggage. This makes it possible for an adult traveling alone with a child to bring a car seat to secure the child. The car seat travels easily over curbs and stairs. Since the car seat is lightweight, it is easily lifted up into a shuttle bus. No conversion steps are necessary for a trip in a shuttle bus or tram. Since a stroller does not have to be checked, for a short trip no checking of baggage at all may be required. Skipping the baggage check saves a significant amount of time at both ends of the flight.

Once in the aircraft, the car seat is simply lifted onto the airplane seat and fastened in place. The child does not have to be moved or wakened. During the flight, the child is protected against being thrown around by sudden turbulence. In case of a crash, the child's life may be saved.

The car seat can be used for carrying the child through a terminal to reach a connecting flight. On arrival at a destination, the car seat can be used in a rental car, a taxi, or in the automobiles of friends and relatives. Renting or borrowing a car seat is not necessary. Parents traveling with a child car avoid carrying the child for any distance. This reduces fatigue and makes the trip more pleasant. For a toddler, the car seat provides a way to prevent the child from wandering away when the parent is distracted.

Referring to FIGS. 7–10, there are shown various views of another embodiment of the invention, wherein a wheeled frame may be detachably attached to a standard child car seat. The attached assembly has the same advantages as the wheeled child seat described above. Wheeled child seat frame 60 comprises a lower frame 62 having spaced tubular uprights 64, an upper cross member 66 meeting with tubular uprights 64 at upper cross member left joint 68 and upper cross member right joint 70. Tubular uprights 64 extend slightly above upper cross member left and right joints 68 and 70, respectively. Lower frame 62 is completed by lower frame lower cross member 72 attached to the lower end of lower frame tubular uprights 64 at left joint 74 and right joint 76 to form a generally rectangular frame. Lower frame lower cross member 72 extends outward from lower frame 62 forming left curved extension 78 which curves downward from the horizontal to the vertical, a left wheel housing 80 being mounted on the end, thereof. Left wheel 82 is held for rotation within housing 80. Similarly, lower frame lower cross member 72 extends outward from lower frame 62 forming right curved extension 84 which curves downward from the horizontal to the vertical, a right wheel housing 86 being mounted on the end thereof. Right wheel 88 is held for rotation within housing 86.

A tubular handle frame 90 is provided which is slidably mounted within lower frame 62 at lower frame tubular upright open ends 65. Frame 90 comprises an upper cross member handle 92, and a left handle frame upright 94 connected by a left side right angle bend 96 and having a lower end 98, and an a right handle frame upright 100 connected by right side right angle bend 102 and having a lower end 104. Tubular handle frame uprights 94 and 100 are slidable within lower frame uprights 64 to at least a stored position and an extended position. Known means such as detents (not shown) maintain handle frame 90 at one of the at least two positions.

Left support plate 106 is connected to lower frame lower cross member 72 at joint 108 at a right angle to lower frame 62 and spaced inward from frame upright connection 74. Similarly, right support plate 110 is connected to lower frame lower cross member 72 at joint 111 at a right angle to lower frame 62 and spaced inward from frame upright connection 76.

Figure 10:
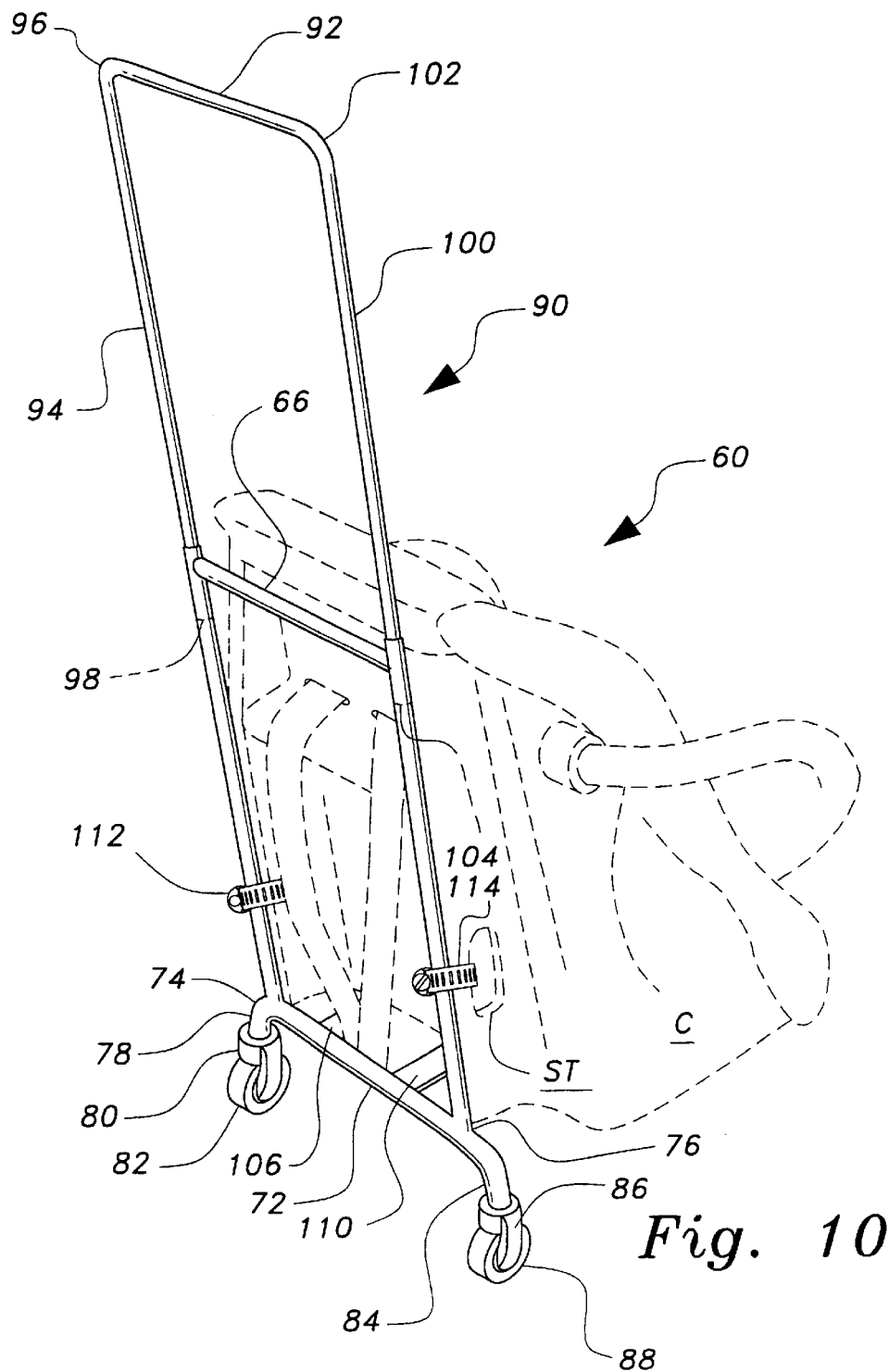
FIG. 10 is a rear environmental perspective view of the wheeled frame of FIG. 7 with an attached child seat.

Left clamp 112 and right clamp 114 are mounted at equal distances along respective lower frame uprights 64 above lower frame lower cross member 72. Clamps 112 and 114 may be in the for of a hose clamp and spot welded at their respective positions along lower frame uprights 64. As seen in FIG. 10, the standard child seat rests on support plates 106 and 108, while clamps 112 and 114 are fastened around the rear of the child seat C through seat belt through-holes ST which serve as fastening apertures 30 as previously described in the first embodiment (see FIG. 3, above) and are placed so as to receive the seat belts of a car or aircraft seat.

Wheels 82 are separated as far as possible to provide stability to the unit when being pushed or pulled by handle 92, while remaining at an overall width to allow the unit to travel along a passenger aircraft isle.

The inventive wheeled frame may be made of any suitable material, such as aluminum or steel. The wheeled frame attached to the standard car seat by the clamps offers the same mode of operation as that of the integral wheeled child car seat described above. The inventive child car seat is placed on the support plates of the wheeled frame and the clamps secured around the respective seatbelt through-holes for use. The wheeled frame may be removed by releasing the clamps when the wheeled frame is not needed.

It is to be understood that the present invention is not limited to the sole embodiments described above, but encompasses any and all embodiments within the scope of the following claims.

We claim:

1. A child car seat for transporting a child, the car seat comprising:

a seat portion, said seat portion being adapted to seat the child therein, said seat portion having a seat back, two side edges, a top end, and a bottom end;

a fastening means for fastening the car seat to an automobile seat and to an airplane seat;

a harness, said harness being attached to said seat portion and retaining the child in said seat portion, said harness, said seat portion, and said fastening means being adapted to protect the child in the event of a sudden deceleration;

a pull handle, said pull handle being rigid and having two slide tubes and an extension portion, each of said slide tubes being attached to said seat back, said extension portion being generally U-shaped and having two telescoping tubes and a cross bar, each of said telescoping tubes mating with one of said slide tubes, said cross bar having two ends, and each of said ends of said cross bar being attached to one of said telescoping tubes, such that said extension portion has a retracted position and at least one extended position;

a roller assembly attached to said seat portion proximate said bottom end and to said seat back, said roller assembly including two rollers and at least one axle, each said roller being located proximate to one of said side edges, each said roller assembly having a wheel portion, each said wheel portion being rotatable about said axle, said car seat being adapted to roll along a surface on the rollers when pulled by the handle in said extended position, the weight of the child being distributed between said rollers and said pull handle when rolling; and a stabilizer, said stabilizer being pivotally attached to said roller assembly, said stabilizer having a stabilizing position and a folded position, said stabilizer in said stabilizing position being adapted to prevent said rollers from contacting a surface supporting the car seat.

2. The car seat according to claim 1, wherein said stabilizer is attached to said at least one axle, and said stabilizer when in the folded position is adjacent to the bottom end of said seat.

3. The car seat according to claim 2, wherein said stabilizer is releasably lockable relative to said car seat in said stabilizing position and said folded position.

4. The car seat according to claim 3, wherein said roller assembly has at least one wheel portion extending outboard of a corresponding said side edge of said car seat;

said wheel portion having a telescoping axle;

said telescoping axle having an outer section and an inner section;

said outer section having an outer end having a button and a spacer adjacent to said corresponding side edge;

said wheel portion being attached to said outer axle section between said button and said spacer;

said telescoping inner and outer axle portions having a parting biasing spring therein;

said stabilizer being pivotally attached to said outer axle section;

said spacer having a tab; and said stabilizer having a lock so shaped and dimensioned as to interlock with said tab;

whereby, upon pressing inward on said button, said biasing spring is compressed, allowing said stabilizer to pivot; and whereby, upon releasing said button, said stabilizer is locked in place by means of interlocking said tab and said lock.

5. The car seat according to claim 1, wherein said seat portion includes a canopy, and said canopy is attached to the top end of said seat back.

6. The car seat according to claim 1, wherein said harness includes a harness bar, said harness bar being padded and having two ends, each said end of said harness bar being attached to one of said side edges of said seat portion.

7. The car seat according to claim 1, wherein said seat portion includes a footrest.

8. The car seat according to claim 1, wherein each said roller includes at least one axle support, and said axle is fixedly attached to said axle supports.

9. The car seat according to claim 8, wherein each axle support is fixedly attached to said seat portion.

10. The car seat according to claim 9, wherein each said roller includes two axle supports, said axle supports being so located that each said roller is inboard of each corresponding side edge.

11. The car seat according to claim 1, wherein said means for fastening said car seat to an automobile seat or an airplane seat is a fastening aperture extending through said seat back.

* * * * *